INVENTOR.
Oliver H. Attridge,
BY
ATTORNEY.

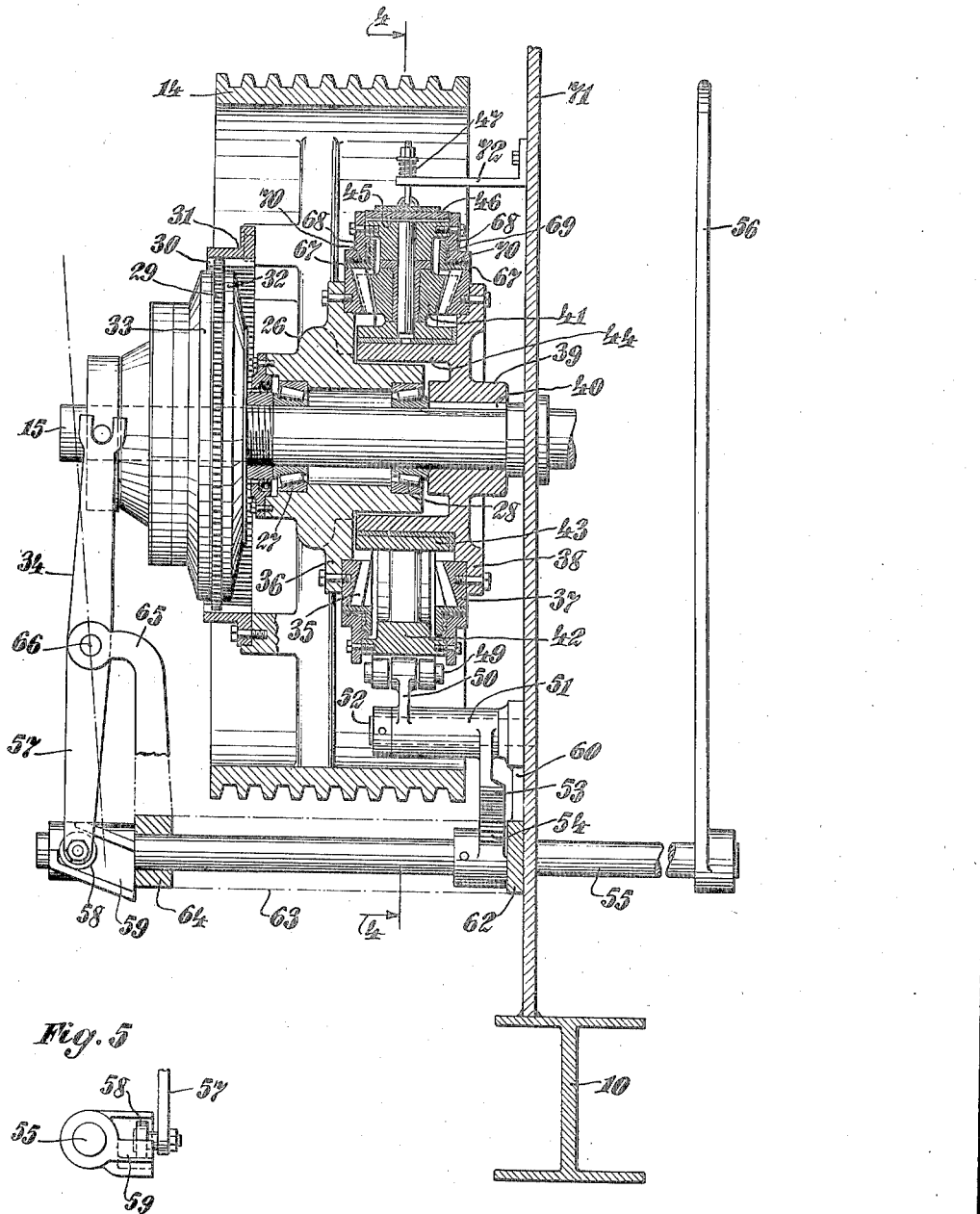

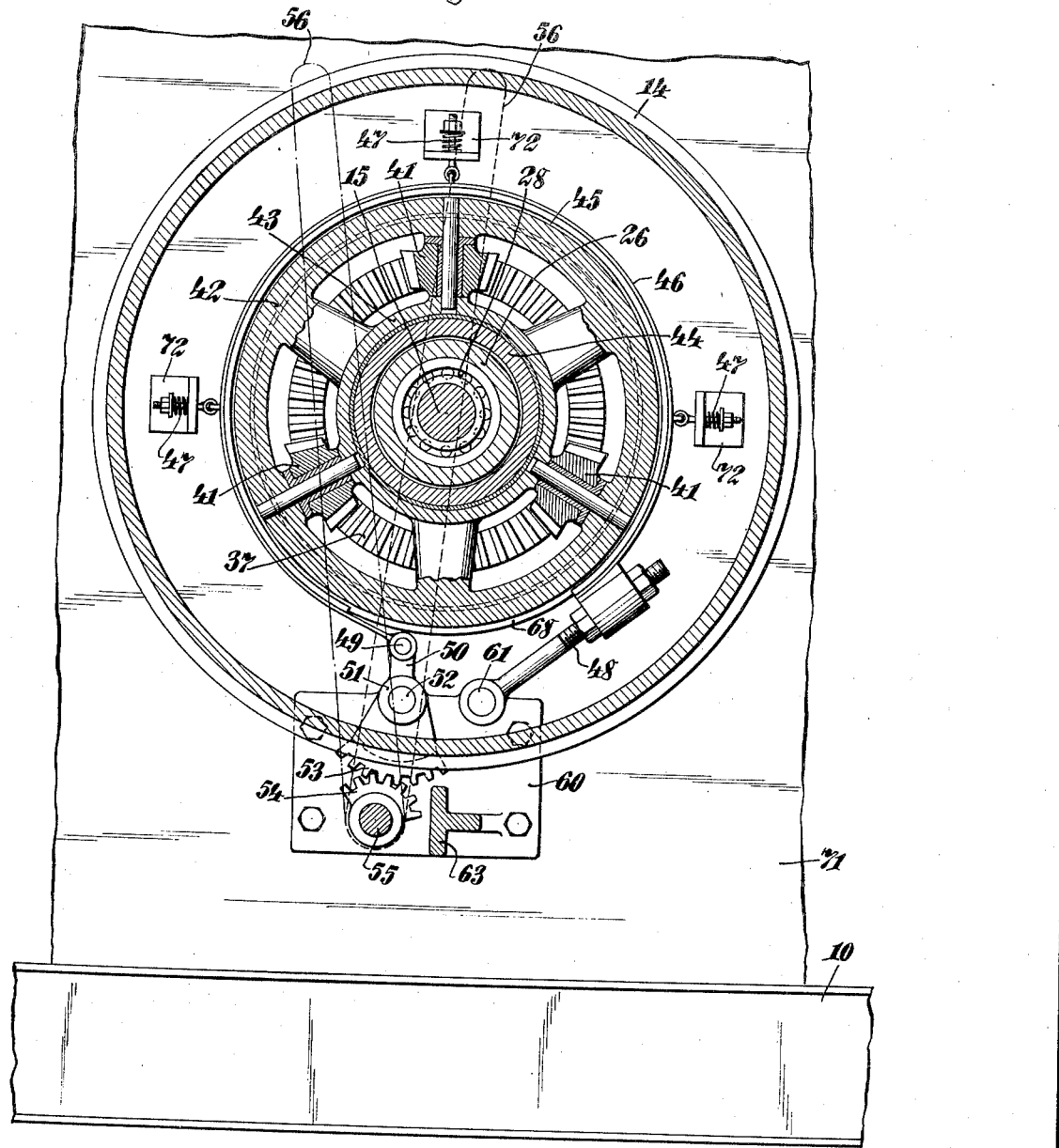

Patented Apr. 8, 1941

2,238,006

UNITED STATES PATENT OFFICE 2,238,006

REVERSING MECHANISM

Oliver H. Attridge, Tulsa, Okla., assignor to Lucey Export Corporation, New York, N. Y., a corporation of Delaware Application January 26, 1940, Serial No. 315,667

12 Claims. (Cl. 74—297)

The invention herein disclosed relates to reversible drive gearing.

Special objects of the invention are to combine in a minimum of parts, weight and cubic contents, practical and efficient mechanism for imparting either forward or reverse motion to a shaft upon which said mechanism may be mounted; further to provide such a device for input power shafts generally but particularly for installations where internal combustion engines operating in one direction only are employed for powering drilling rigs.

Other desirable objects and the novel features of the invention by which all purposes are attained, will appear or are set forth in the following specification.

The drawings which accompany and form part of the specification illustrate one of the practical embodiments of the invention. The precise structure however may be modified and changed as regards this particular disclosure all within the true intent and broad scope of the invention as hereinafter defined and claimed.

Fig. 3 is an enlarged broken sectional view of the reversible drive unit as on substantially the plane of line 3—3 of Fig. 2.

Fig. 4 is a broken sectional view substantially on the line 4—4 of Fig. 3.

Fig. 5 is a broken end view of the inclined cam means for throwing the forward clutch yoke.

Figure 1:
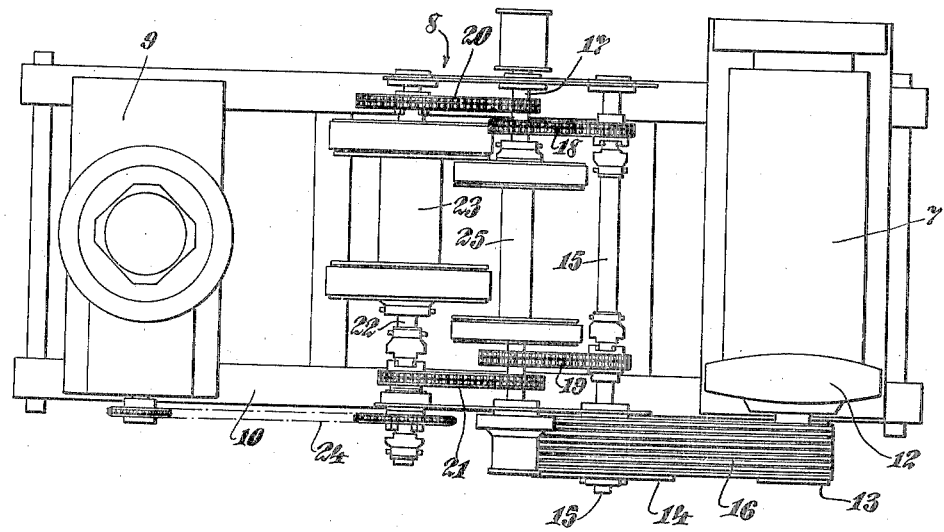
Fig. 1 is a plan view illustrating an embodiment of the invention in the form of a complete forward and reverse power unit built into a multiple belt pulley, directly driven from the engine and mounted on a draw-works jack shaft.
Figure 2:
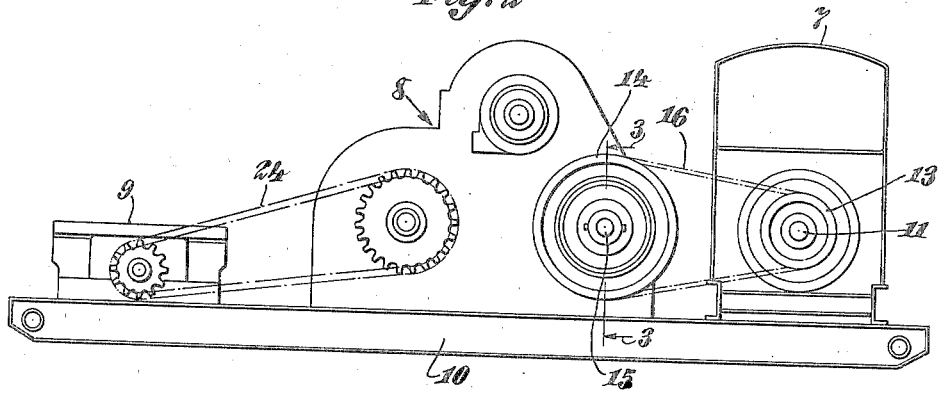
Fig. 2 is a front view of the same apparatus.

The drilling unit illustrated in Figs. 1 and 2 is of the "portable" type with the engine 7, drawworks 8, and rotary 9, all mounted on a single sled-like base 10.

The power shaft 11, connected with or forming part of the engine shaft through the medium of a clutch at 12, carries in this instance, a grooved V-belt pulley 13, connected with a corresponding pulley 14, on the jack shaft 15, of the drawworks by multiple belts 16.

In the particular form of drawworks shown, the jack shaft 15, drives the line shaft 17, through two sets of clutch controlled, different speed chain connections 18, 19, and this shaft through two sets of different speed clutch controlled chain connections 20, 21, drives the drum shaft 22. The latter carries a clutch controlled drum 23, and drives the rotary through chain connections 24. The line shaft carries a clutch controlled second drum 25.

Forward drive and reverse of the drawworks is effected entirely from the power input unit built into the driven member, which in this instance, is the multiple V-belt pulley 14.

By reference to Figs. 3 and 4, it will be seen that the driving pulley 14 is mounted for free rotation on the jack shaft 15, by having the hub portion 26, of the same supported on taper roll bearings 27, 28.

Forward rotation is imparted to the shaft through a forward drive clutch which may be of conventional design and which is shown as made up of a clutch plate 29, keyed at 30, to a clutch driving ring 31, fixed to the spoke portion of the pulley and adapted to be gripped between the clutch flanges 32 and 33, the first of which is fixedly secured on the shaft and the other constituting the movable clutch element and being slidingly keyed on the shaft and actuated by the yoke 34.

The reverse gear mechanism is of the differential type, comprising in the illustration, a bevel ring gear 35, secured to the hub flange 36, of the pulley, a companion opposed bevel ring gear 37, secured to the flange 38, of a hub member 39, keyed or otherwise fixedly secured to the shaft at 40, and interposed bevel pinions 41, carried by a spider 42. The latter is shown as having a hub portion 43, rotatably mounted on a supporting hub structure 44, carried by the hub member 39 fixed to shaft 15.

As shown in Fig. 3, the supporting hub 44, of the hub member 39 is of cylindrical tubular form and extends inward over the rotatably mounted hub portion 26, of the pulley, thus to bring the parts into compact relation with the differential reverse gear disposed within the bounds of the pulley flange.

The exterior of the pinion carrying spider 42, is shown as finished as a cylindrical brake flange 45, engageable by a brake band 46, supported in free floating relation by spring connections 47.

One end of the brake band is shown adjustably connected to an anchor link 48, and the opposite end is shown pivotally connected at 49, to an arm 50, of a sleeve 51, pivotally confined on a fixed supporting stud 52, and carrying a gear segment 53, engaged by a companion gear segment 54, on the control rock shaft 55. The latter is indicated as provided with a suitable actuating lever 56, which may be located at any convenient point, as by extension of shaft 55, or to which suitable actuating means may be connected.

To effect the reverse actuation of the clutch and brake, the forward clutch actuating yoke 34, is connected with and operated from the same control shaft, in the illustration, by provision of the lower end of the yoke lever 57, with a roller 58, operating in an inclined cam way 59, carried by said control shaft.

For the purpose of mounting and supporting the clutch and brake controlling parts in accurately related position, a special mounting bracket is shown at 60, carrying the pivot stud 61 (Fig. 4) for the brake band link 48, the mounting stud 52, for the brake actuating rocker 51, a bearing at 62, Fig. 3, for the control shaft 55 and said bracket further having a projecting arm 63, carrying an outboard bearing 64, for said control shaft and an upwardly extending projection 65, carrying the pivotal support 66, for the forward clutch lever 57.

To hold necessary lubricant in the reverse gear, special sealing means are provided, consisting in the illustration of sealing rings 67, secured to and extending inwardly over the edges of the bevel ring gears 35, 37, Fig. 3, and companion sealing rings 68, carried by the pinion spider 42, and cooperating with the first set of rings.

The inner portions of the companion rings are shown in overlapping relation and as having the intermeshing ribs and grooves 69, of a labyrinth seal and the outer portions of the rings are shown as cylindrically conformed and as carrying felt seals 70, or the equivalent.

The extension of the sealing rings 67, over the rims of the bevel gears 35, 37, baffles the oil thrown outward by centrifugal force or pumped outwardly by the intervening pinions 41, and this construction, together with the tongue and groove cooperating relation of the sealing rings, provides a substantially oil tight case.

The bracket which carries the control shaft and other parts is shown as mounted on the side plate 71, of the drawworks but the method of mounting and the particular form of bracket, etc. may vary with different installations and uses of the invention. Also as shown in Fig. 3, the spring supports 47, for the brake band are carried by small brackets 72, mounted on this same side plate and projecting therefrom, within the rim of the pulley.

With this invention, the entire forward drive and reverse gear mechanism is combined practically within the limits of the pulley or other driven member. This unitary construction is of such a nature that it may be mounted wherever the pulley or driving member might be mounted, for instance, between the shaft bearings or in the overhung relation illustrated and without requiring a special or additional shaft for the reverse clutch, such as has heretofore been general practice. The complete unit also is of such a size that it may be placed on almost any shaft which is already present for carrying clutches, sprockets or other gear.

The combination clutch and brake unit has the special advantage that the driving member, such as the belt pulley 14, is arranged for free rotation on the shaft and so may continue in rotation as driven for instance, from a one direction rotation internal combustion engine, while the shaft on which it is mounted remains stationary, ready to turn in one direction or the other upon the closing of the clutch or brake. This free running characteristic also eliminates the problem of accurate alignment of the unit with other portions of the driven apparatus.

The single control mechanism insures that operation of the control lever from neutral position in one direction, will close the forward clutch and throw out the brake band of the reverse gearing and that with movement in the opposite direction from the neutral position, the forward running clutch will be opened and the brake band closed on the pinion carrier to effect drive of the shaft in the reverse direction. When running forward, the reverse gears will rotate bodily with the shaft, relative motion of such gears taking place only when the pinion carrier is held for effecting reverse drive. The baffling of the lubricant by the overstanding sealing rings 67, and the cooperative relationship of these and the companion sealing rings 68, provides a practically oil tight gear case in which all parts are kept properly lubricated and in free running order. The mounting of the bevel pinion carrier 42, on the hub 44, of the bevel ring gear carrier 39, and the tubular formation of this supporting hub in surrounding relation about the hub of the pulley conserves space and prevents strain or undue wear of parts. The device consists of but relatively few parts, all of simple sturdy design. While ordinarily, the best practice is to make the bevel ring gears 35, 37, as separate elements attached to appropriate flanges of the rotatable pulley hub 26, and fixed hub 39, it may be possible to construct these gears integrally with such parts. Many other changes are possible and the claims should be construed thus broadly in the absence of any clear intent of limitations to specific details.

What is claimed is:

1. Reversing mechanism, comprising in combination, a reversibly driven shaft and a drive pulley constantly turning in one direction and rotatably mounted thereon, a forward drive clutch between said pulley and shaft and disposed substantially within the outlines of said pulley and a reverse drive gearing also disposed substantially within the outlines of said pulley and comprising companion opposed ring gears carried by said pulley and affixed to the shaft respectively, connecting pinions between said opposed ring gears, a pinion carrier rotatably supported on the ring gear which is affixed to the shaft and located within the rim of said pulley, releasable brake means for holding said pinion carrier against rotation and common means for closing said brake and throwing out said forward drive clutch and for closing said forward drive clutch and throwing out said reverse drive brake.

2. Reversing mechanism, comprising in combination, a shaft and a pulley rotatably mounted thereon, a forward drive clutch between said pulley and shaft and disposed substantially within the outlines of said pulley and a reverse drive gearing also disposed substantially within the outlines of said pulley and comprising companion opposed ring gears carried by said pulley and affixed to the shaft respectively, connecting pinions between said opposed ring gears, a pinion carrier rotatably supported within the rim of said pulley, releasable brake means for holding said pinion carrier against rotation and common means for closing said brake and throwing out said forward drive clutch and for closing said forward drive clutch and throwing out said reverse drive brake, said pulley having a hub portion journalled on the shaft, the gear which is fixed to the shaft having a tubular hub about said pulley hub and the pinion carrier being rotatably mounted on said tubular hub.

3. Reversing mechanism, comprising in combination, a shaft and a pulley rotatably mounted thereon, a forward drive clutch between said pulley and shaft and disposed substantially within the outlines of said pulley and a reverse drive gearing also disposed substantially within the outlines of said pulley and comprising companion opposed ring gears carried by said pulley and affixed to the shaft respectively, connecting pinions between said opposed ring gears, a pinion carrier rotatably supported within the rim of said pulley, releasable brake means for holding said pinion carrier against rotation and common means for closing said brake and throwing out said forward drive clutch and for closing said forward drive clutch and throwing out said reverse drive brake and companion sealing rings carried by said opposed gears and said pinion carrier respectively.

4. Reversing mechanism, comprising in combination, a shaft and a pulley rotatably mounted thereon, a forward drive clutch between said pulley and shaft and disposed substantially within the outlines of said pulley and a reverse drive gearing also disposed substantially within the outlines of said pulley and comprising companion opposed ring gears carried by said pulley and affixed to the shaft respectively, connecting pinions between said opposed ring gears, a pinion carrier rotatably supported within the rim of said pulley, releasable brake means for holding said pinion carrier against rotation and common means for closing said brake and throwing out said forward drive clutch and for closing said forward drive clutch and throwing out said reverse drive brake and cooperating sealing means carried by said pinion carrier and gears and said sealing means surrounding said gears to baffle lubricant thrown outwardly therefrom.

5. Reversing mechanism, comprising in combination, a shaft and a pulley rotatably mounted thereon, a forward drive clutch between said pulley and shaft and disposed substantially within the outlines of said pulley and a reverse drive gearing also disposed substantially within the outlines of said pulley and comprising companion opposed ring gears carried by said pulley and affixed to the shaft respectively, connecting pinions between said opposed ring gears, a pinion carrier rotatably supported within the rim of said pulley, releasable brake means for holding said pinion carrier against rotation and common means for closing said brake and throwing out said forward drive clutch and for closing said forward drive clutch and throwing out said reverse drive brake and labyrinth packing means between said gears and pinion carrier.

6. Reversing mechanism, comprising in combination, a shaft and a pulley rotatably mounted thereon, a forward drive clutch between said pulley and shaft and disposed substantially within the outlines of said pulley and a reverse drive gearing also disposed substantially within the outlines of said pulley and comprising companion opposed ring gears carried by said pulley and affixed to the shaft respectively, connecting pinions between said opposed ring gears, a pinion carrier rotatably supported within the rim of said pulley, releasable brake means for holding said pinion carrier against rotation and common means for closing said brake and throwing out said forward drive clutch and for closing said forward drive clutch and throwing out said reverse drive brake, and a single mounting bracket for said brake and clutch control means, said brake and clutch control means including a rock shaft journaled in said bracket, a sleeve pivoted on said bracket substantially parallel with said rock shaft, an arm extending from one end of said sleeve within the rim of said pulley for actuating said brake, an arm extending from the opposite end of said sleeve and connected with said rock shaft, a lever pivoted on said bracket operatively engaged at one end with said forward drive clutch and cam connecting means between said rock shaft and the opposite end of said clutch lever.

7. Reversing mechanism, comprising in combination, a reversible driven shaft, a drive member continuously rotating in the same direction for driving the same and comprising a hub rotatably mounted on said shaft, a member fixed on said shaft and having a supporting hub about said rotatable hub, a pinion carrier rotatably mounted on said fixedly carried supporting hub, pinions on said carrier, opposed gears carried by said first freely rotatable hub and by said second fixed hub and in engagement with said pinions and releasable brake means for holding said pinion carrier against rotation while thus mounted on the supporting hub which is fixed to the shaft.

8. Reversing mechanism, comprising in combination, a reversible driven shaft, a drive member continuously rotating in the same direction for driving the same and comprising a hub rotatably mounted on said shaft, a member fixed on said shaft and having a supporting hub about said rotatable hub, a pinion carrier rotatably mounted on said supporting hub, pinions on said carrier, opposed gears carried by said first freely rotatable hub and by said second fixed hub and in engagement with said pinions and releasable brake means for holding said pinion carrier and a surrounding lubricant casing enclosing said opposed gears and pinions and disposed within the confines of said driving member.

9. Reversing mechanism, comprising in combination, a shaft, a member for driving the same and comprising a hub rotatably mounted on said shaft, a member fixed on said shaft and having a supporting hub about said rotatable hub, a pinion carrier rotatably mounted on said supporting hub, pinions on said carrier, opposed gears carried by said first freely rotatable hub and by said second fixed hub and in engagement with said pinions, releasable brake means for holding said pinion carrier and companion sealing rings with interposed packing medium carried by said opposed gears and pinion carrier.

10. Reversing mechanism, comprising in combination, a reversible driven shaft, a drive member continuously rotating in the same direction for driving the same and comprising a hub rotatably mounted on said shaft, a member fixed on said shaft and having a supporting hub about said rotatable hub, a pinion carrier rotatably mounted on said fixedly carried supporting hub, pinions on said carrier, opposed gears carried by said first freely rotatable hub and by said second fixed hub and in engagement with said pinions, releasable brake means for holding said pinion carrier against rotation while thus mounted on the supporting hub which is fixed to the shaft and forward drive clutch means interposed between said driving member and shaft and including a clutch disc rotatable with said driving member and cooperable relatively movable clutch discs mounted on and carried by said reversible driven shaft, said clutch discs being disposed substantially within the confines of said driving member.

11. Reversing mechanism, comprising in combination, a shaft, a member for driving the same and comprising a hub rotatably mounted on said shaft, a member fixed on said shaft and having a supporting hub about said rotatable hub, a pinion carrier rotatably mounted on said supporting hub, pinions on said carrier, opposed gears carried by said first freely rotatable hub and by said second fixed hub and in engagement with said pinions, releasable brake means for holding said pinion carrier, forward drive clutch means interposed between said driving member and shaft and common means for reversely actuating said reverse and forward clutch mechanisms including a rock shaft, connections from said rock shaft for controlling said brake, a cam on said rock shaft and a forward clutch control lever operable by said cam.

12. Reversing mechanism, comprising in combination, a shaft driving member having hub and rim portions, bearing means for rotatably supporting said hub portion on a shaft, forward-drive clutch means for coupling said driving member in forward drive relation to a shaft, a second hub member, means for fixedly mounting said second hub member on a shaft, a pinion carrier rotatably supported on said second hub member, opposed gears carried by said first and second hub members, pinions on said pinion carrier in mesh with said opposed gears, a releasable brake about said pinion carrier, all of said described parts being disposed substantially within the rim of said shaft driving member.

OLIVER H. ATTRIDGE.